United States Patent [19]

Kipp et al.

[11] 4,245,221
[45] Jan. 13, 1981

[54] FM-CW RADAR RANGING SYSTEM WITH AUTOMATIC CALIBRATION

[75] Inventors: Ronald W. Kipp, Croydon Manor, Pa.; Henry C. Johnson, Neshanic, N.J.

[73] Assignee: RCA Corporation, New York, N.Y.

[21] Appl. No.: 33,826

[22] Filed: Apr. 27, 1979

[51] Int. Cl.³ .............................................. G01S 7/40
[52] U.S. Cl. .................................. 343/17.7; 343/5 SW
[58] Field of Search ........................... 343/5 SW, 17.7

[56] References Cited

U.S. PATENT DOCUMENTS

| | | |
|---|---|---|
| 3,599,207 | 8/1971 | Foianz ........................ 343/5 SW X |
| 4,008,475 | 2/1977 | Johnson ................................ 343/14 |
| 4,106,020 | 8/1978 | Johnson ....................... 343/17.7 X |

*Primary Examiner*—Malcolm F. Hubler
*Attorney, Agent, or Firm*—Samuel Cohen; Joseph D. Lazar; Raymond E. Smiley

[57] ABSTRACT

A frequency-modulated continuous wave (FM-CW) ranging system for determining the range of a target includes apparatus which utilizes a target simulating delay line and target illuminating antenna, alternately switched to a difference frequency determining circuit and a scaling device to compensate for undesired changes of the FM modulation waveform.

7 Claims, 1 Drawing Figure

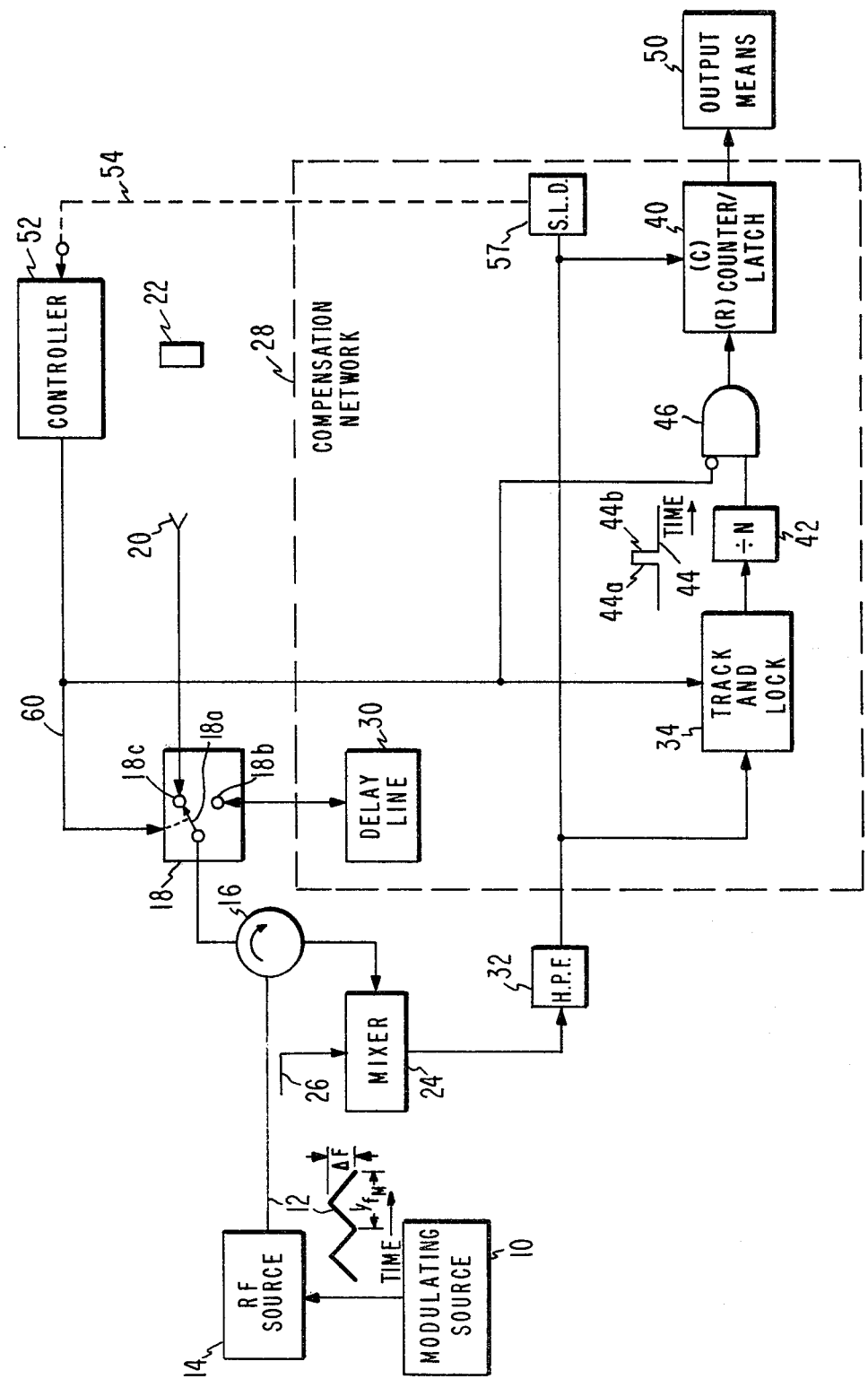

FM-CW RADAR RANGING SYSTEM WITH AUTOMATIC CALIBRATION

CALIBRATION

The present invention relates to continuous wave frequency-modulated (FM-CW) ranging systems and, in particular, to an automatic calibration system to compensate for undesired charges in the peak value of the modulation frequency or its rate.

FM-CW radar ranging interrogation systems are well known in the art. In such systems, a radio frequency (rf) interrogation signal, frequency modulated with a given modulation waveform, is transmitted toward a target and a portion thereof is reflected from the target back to the interrogating system. The reflected signal as received at the interrogating system is delayed in time, and hence shifted in frequency, from the instantaneous interrogation signal by an amount, $\tau$, proportional to the range, R, of the target. For example, when the interrogation signal is modulated by a triangular waveform having a peak value, $\Delta F$, and a period, $1/f_m$, the frequency shift or difference frequency, $f_R$ (also known as beat frequency), is equal to the time derivative of the frequency of the interrogation signal, $df/dt$, times the round trip time delay to and from the target, $\tau$. Frequency, $f_R$, may be expressed as:

$$f_R = \frac{df}{dt} \cdot \tau = \frac{4R(\Delta F \cdot f_m)}{C} \quad (1)$$

where C is the speed of light. The range, R, or distance between the target and the interrogating system is determined by measurement of the frequency shift, $f_R$. Rearranging formula (1) provides the formula for range, R:

$$R = \frac{f_R \cdot C}{4(\Delta F \cdot f_m)} \quad (2)$$

or $$R = K \cdot f_R \quad (3)$$

where $$K = \frac{C}{4(\Delta F \cdot f_m)} \quad (4)$$

if $\Delta F$ and $f_m$ remain constant, K remains constant.

In practice, such FM-CW radar ranging system have been plagued with errors due to drifts in the maximum frequency excursion ($\Delta F$) and/or period ($1/f_m$) of the frequency modulation waveform. Such drifts are often caused merely by changes in ambient conditions such as temperature, power supply variations and timing circuit drifts. U.S. Pat. Nos. 3,968,492 issued July 6, 1976, to G. Kaplan and 3,974,501 issued Aug. 10, 1976, to A. Ritzie, disclose signal processors for FM-CW ranging systems which make provisions for compensating for drifts in the period, $1/f_m$, of the modulation waveform. However, no provision is made for compensating for drifts in the frequency excursion, $\Delta F$, of the modulation waveform. The prior art has typically used one of four methods of compensating for drifts in frequency excursion.

In one such prior art method, while the system is off line, a delay line of known length is temporarily connected between the transmitter and receiver antenna feedlines. The time delayed signal, generated by the delay line from a portion of the interrogation signal simulates a reflected signal from a target at a predetermined range. The processor is then manually adjusted to display the predetermined range and the delay line is thereafter disconnected. Such a method is limited in use in that any subsequent changes in the modulation frequency or amplitude which may be undetected require recalibration of the system, again, while it is off line.

A second prior art method utilizes a delay line in conjunction with a frequency discriminator in a complex closed loop stabilizing system. Such a system is described in *The Radar Handbook*, M. I. Skilnik, McGraw Hill, 1970, chapter 16, pages 29–32. However, frequency discriminators are relatively expensive and not suitable for large volume usage. Such frequency discriminator systems maintain a constant frequency excursion $\Delta F$, but do not provide an accurate calibration for the drifts of the modulation waveform frequency, $f_m$. Such a ranging system must additionally employ, for example, relatively expensive crystal oscillators, temperaturee controlled ovens, or both.

A third prior art method, disclosed in U.S. Pat. No. 4,008,475 issued Feb. 17, 1977, to the present inventor, utilizes a delay line in a feedback network to alter one of $\Delta F$ or $f_m$ to keep their product constant.

U.S. Pat. No. 4,106,020 issued Aug. 8, 1978, to the present invention is directed to a fourth prior art method in which a delay line continuously simulates a target at a predetermined range outside practical target ranges. A first signal consisting substantially of difference signals corresponding to the predetermined range and a second signal consisting substantially of difference signals corresponding to target ranges within the range domain of the system are simultaneously generated by a mixer. The second signal is applied to a means for determining a parameter thereof representative of target range, which means also has applied to it the first output signal for scaling the parameter. In a practical system, the delay line includes small mismatches along its length that produce signals that can correspond to ranges in the domain of the target. This effect reduces the capability of the system to discern true target signals.

The present invention is directed to an improvement of the above-described fourth method and includes means for alternatively generating signals indicative of target range and predetermined range and means for storing one of the two range signals and further means responsive to the stored range and non-stored range for scaling the signal indicative of target range by the signal indicative of predetermined range.

The sole drawing FIGURE is a block diagram of an FM-CW radar system in accordance with a preferred embodiment of the present invention.

As shown in the FIGURE, a modulating source 10, such as one which produces triangular waveform 12, is coupled to radio frequency source 14 for purposes of modulating the radio frequency signal produced by source 14 in accordance with waveform 12. Waveform 12 is a plot of frequency vs time. The maximum frequency excursion is $\Delta F$ with a period $1/f_m$. Source 14 is coupled to a suitable three port circulator 16. Circulator 16 is coupled to a means such as electronic switch 18 for passing signals alternatively between circulator 16 and either antenna 20 or delay line 30. Switch 18 may be a suitable electronically controlled S.P.D.T. r.f. switch. When switch arm 18a is connected to terminal 18c, antenna 20 is connected to circulator 16. When switch arm 18a is connected to terminal 18b, delay 30 is connected to circulator 16.

Antenna 20 may be a printed circuit corporate feed antenna of the type described in U.S. Pat. No. 3,587,110 issued June 22, 1971 to O. M. Woodward or a standard gain horn antenna such as a Narda Model 640. FM-CW signals from antenna 20 are directd to and reflected from suitably disposed targets within the pattern of antenna 20 such as target 22, the range of which from antenna 20 is to be determined.

Delay line 30, which is operated in the reflection mode, may be of the accoustic type or, simply, a coaxial line. The delay in delay line 30 is normally for practical reasons chosen to simulate a target farther than the range of the most distant target as determined by the equipment sensitivity, physical limitations and real target travel. However, delay line 30 may simulate a target at a range shorter than the maximum expected range of a real target.

Depending on the position of arm 18 a return signals to antenna 20 or delay line 30 are directed to and reflected by circulator 16 to means for deriving difference frequency signals, $f_R$, notably a conventional mixer 24 such as the Anaran model 7G0118 mixer. Mixer 24 is also receptive of a sample of the radio frequency source 14 output signal provided by a directional coupler 26 in the line between RF source 14 and circulator 16. The output of mixer 24 is coupled to a high pass filter 32 arranged to reject frequencies produced by modulating source 10.

The arrangement of the elements just described, exclusive of switch 18 and delay line 30, provides a means for enabling measurement of a parameter of interest such as the range of target 22 in a manner well known in the art. The range of target 22 can be accurately determined if the parameters of the signal from source 14 are known. However, as mentioned previously, if either or both of the modulating signal parameters $f_m$ or $\Delta F$ inadvertently vary without some offsetting compensation (or correction of the parameters $f_m$ or $\Delta F$) the computed range of targets such as target 22 will be incorrect. In accordance with the invention, a compensation network 28 is provided as described below.

The output terminal of high pass filter 32 is coupled to a track and lock circuit 34 and to the counting (C) terminal of means (40) enabling scaling of the frequencies passed by filter 32 representing the distance of real targets 22 from antenna 20. One such scaling means is a digital counter/latch 40. Track and lock circuit 34 is coupled to a divide-by-N circuit 42. Circuit 42 produces one pulse such as 44 for each N cycles of frequency received from track and lock circuit 34. Circuit 42 is coupled to one input terminal of an AND gate 46 the output of which is coupled to the reset/latch (R) terminal of counter/latch circuit 40. The output terminal of counter/latch 40 is coupled to output means 50 which is suitably in the form of a display device for displaying distance as a function of the count stored in circuit 40.

A controller 52 is coupled to switch 18 to control the position of switch arm 18a, to track and lock circuit 34 and to inhibit terminal of AND gate 46. The design of controller 52 will depend on the frequency with which it is desired to calibrate the system. For example, it may be desirable to switch in alternately delay line 30 and antenna 20 every few seconds, in which case controller 52 may be a suitable multivibrator. Alternatively, it may be desired to calibrate the system only when target signals are below a predetermined threshold, such as when target 22 is at a greater distance from antenna 20. Accordingly, a signal level detector 57 may be provided which is coupled to filter 32 to receive signals therefrom indicative of the range of target 22. The signal level (S.L.D.) detector 57 feedback path to controller 52 is indicated by dotted line 54. Controller 52 will be assumed to produce a logic 1 signal which causes switch arm 18a to be positioned to terminal 18b or a logic 0 signal which causes switch arm 18a to be positioned to terminal 18c. A logic 1 signal from controller 52 disables AND gate 46 and enables circuit 34 to track frequencies associated with delay line 30. Conversely, a logic 0 signal from controller 52 primes AND gate 46 and disables circuit 34.

Track and lock circuit 34, when receiving the logic 1 signal from controller 52, tracks the frequency of the signal it receives from high pass filter 32. When circuit 34 is receiving a logic 0 signal from controller 52 it continues to produce the frequency it was tracking. Track and lock circuit 34 may be a commercially available phase lock loop which incorporates an RC network which is switched in or out of the loop depending on the polarity of the signal from controller 52. Alternatively, circuit 34 may contain in order: 1. a frequency-to-voltage circuit, 2. a sample and hold circuit, which is responsive to a logic 1 signal from controller 52 to sample the voltage from the frequency-to-voltage circuit and, when a logic 0 signal is received from controller 52 to hold the voltage sampled, and 3. a voltage-to-frequency circuit which produces a frequency corresponding to the voltage produced by the sample and hold circuit. All these circuits are commercially available circuits and thus will not be further described.

In one exemplary system, target ranges of interest, e.g., 6.0 to 18.5 meters from antenna 20, produce a frequency, $f_R$, having a value typically between 13 and 40 kHz while the value of the frequency, $f_R$, associated with delay 30 is typically 100 kHz. In such an exemplary system, N is divide-by-N circuit 42 may be chosen to be 100,000 such that nominally a momentary reset pulse is received at counter 40 each second. With such a system the maximum count reached in counter 40 is equal to the frequency $f_R$ of the desired target. Alternatively, the value N may be selected such that the maximum value reached in counter 40 is exactly equal to the range in desired units of measure (meters, feet, etc.) of target 22. This is a matter of design choice as determined by the particular type of utilization device for output means 50 chosen.

In operation, RF source 14 produces an RF signal continuously modulated in accordance with waveform 12 which is alternatively sent to delay line 30 and to antenna 20 to be radiated thereby toward targets such as 22. Under the control of controller 52 delayed return signals from the target 22 as received at antenna 20 or signals reflected from delay line 30 are passed via circulator 16 to mixer 24. Mixer 24 also receives a sample of the transmitted RF signal from coupler 26. Controller 52 is producing alternating logic 1 and logic 0 signals to position arm 18a to terminal 18b or terminal 18c, thus passing signals from delay line 30 or antenna 20 to mixer 24.

Mixer 24 produces difference frequencies from the signals it receives having frequency components $f_{R1}$ or $f_{R2}$, depending on whether controller 52 is producing a logic 0 or logic 1, which frequency components directly correspond respectively to the range to target 22 and the simulated "range" of delay line 30. If $\Delta F$ and $f_m$ of waveform 12 remain constant, the relationship of the frequency generated by mixer 24 to the range of real target 22 and target simulating delay line 30 is also a constant.

When controller 52 is producing a logic 0 and thus frequency $f_{R1}$ is present, it is passed by high pass filter 32 and advances counter/latch 40 by, for example, one count for each cycle or each X cycles of frequency, where X is a fixed integer. Frequency $f_{R1}$, when present, is also applied to track and lock circuit 34. However, when frequency $f_{R1}$ is present, the logic 0 signal from controller 52 blocks circuit 34 from tracking frequency $f_{R1}$.

Counter/latch 40 receives periodic reset pulses from divide-by-N counter 42 via AND gate 46 so long as controller 52 is producing a logic 0. The leading edge 44a of a pulse 44 from divide-by-N circuit 42 is passed by AND gate 46 to prime counter/latch 40 to hold the count in counter latch 40. The trailing edge 44b of pulse 44 produced by divide-by-N 42 resets counter/latch 40.

When controller 52 is producing a logic 1, and therefore frequency $f_{R2}$ is being produced by mixer 24, AND gate 46 is disabled and thus counter/latch 40 maintains the last count received. Further, frequency $f_{R2}$ is passed by high pass filter 32 to track and lock circuit 34. So long as the logic 1 signal from controller 52 is present at the C terminal of track and lock circuit 34, it tracks frequency $f_{R2}$. During the period that circuit 34 is tracking $f_{R2}$ counter/latch 40 is counting $f_{R2}$ cycles. However, since controller 52 has a disable pulse on AND gate 46, the counts in counter/latch 40 are not passed to the latch portion of circuit 40.

When controller 52 again produces a logic 0 signal circuit 34 continues to produce the frequency $f_{R2}$ which it had been tracking. Frequency $f_{R2}$ stored in circuit 34 is divided by circuit 42 to reset periodically counter/latch 40. Since the frequency $f_{R1}$ at the C terminal of counter/latch 40 nominally represents the distance of target 22, the number of cycles of $f_{R1}$ counted by counter/latch 40 just before being reset are a measure of that frequency and also correspond to the range of target 22. The frequency stored in the latch portion of counter/latch 40 may be displayed or otherwise utilized by a suitable output means 50.

If the range of target 22 remains fixed but, for example, maximum frequency excursion, $\Delta F$, of waveform 12 increases by, for example, 10 percent, then, in accordance with formula 1, the frequency $f_{R1}$ increases by the same 10 percent. However, in such a situation, since the same waveform which interrogates target 22 is also applied to delay line 30, the frequency $f_{R2}$ will also increase by the same 10 percent and therefore the counter/latch 40 will be reset 10 percent sooner in time (than if $\Delta F$ had not increased) and thus contain the same count when reset as was the case before $\Delta F$ increased in value. A similar situation occurs with any change in frequency, $f_m$, of waveform 12. Thus, the difference frequency associated with any target, such as 22, is scaled by the difference frequency associated with delay line 30 in a manner which compensates for any changes in $\Delta F$ and/or $f_m$ of waveform 12.

It will be understood that delay line 30 may be replaced by the combination of a second antenna similar to antenna 20 and an additional real target at a known distance. The additional real target (not shown) may be positioned out of the RF beam illumination from antenna 20 and in the RF beam illumination from a similar antenna (not shown) at a known fixed distance. The new target may be inside or outside the range of target 22. It will, thus, be understood that the phrase "means simulating a target at a known range" as used in various ones of the claims is intended to encompass a real target at a known range. Furthermore, the output of track and lock circuit 34 may be connected to the (C) terminal of counter/latch 40 while the high pass filter 32 will then be connected directly to divide-by-N 42. In this arrangement an inverting means, such as an inverter, may be added in path 60 between controller 52 and switch 18. That is, circuit 34 will be arranged to track and lock on signals associated with target 22 rather than delay line 30.

We claim:

1. In a frequency modulated continuous wave ranging system of the type including:
   first means for generating a continuous wave interrogation signal, said interrogation signal being frequency modulated in accordance with a desired waveform and having predetermined parameters enabling measurement of the range R of a target of interest, at least one of said parameters being subject to undesired change in value, causing the measured range to be incorrect;
   second means for transmitting said interrogation signal to a target of interest and receiving reflected signals from said target of interest;
   third means responsive to said interrogation signal for producing a reflected signal indicative of a target at known range, $X_i$;
   fourth means for deriving difference signals indicative of the frequency difference of said reflected signals of said target of interest and known range target from the instantaneous frequency of said interrogation signal, said difference signals being indicative of said ranges R and X, respectively; and
   fifth means responsive to said difference signals from said fourth means for scaling said signals indicative of range R by said signals indicative of range X; wherein the improvement comprises:
   sixth means coupled between said first means and second and third means for alternatively coupling said first and second means and said first and third means such that said fourth means alternatively produces signals indicative of range R and range X; and
   seventh means responsive to signals from said fourth means for storing one of said indications of range X and range R and wherein said fifthe means is responsive to said difference signals stored by said seventh means representing one of ranges R and X and said signals from said fourth menas, representing the one of ranges R and X not stored by said seventh means, for scaling said signals indicative of range R by said signals indicative of range X.

2. The combination as set forth in claim 1 wherein said fifth means is a digital counter/latch responsive to said signal from said fourth means for counting cycles of the same relating to said target of interest and responsive to signals from said fourth means relating to said known range target for storing the count and for resetting said counter, said stored count being indicative of said range.

3. The combination as set forth in claim 1 wherein said third means includes a delay line simulating said target at said known distance.

4. The combination as set forth in claim 3 wherein said sixth means includes a switching means for connecting either of said second means or third means to said first means and controller means for determining which of said second or third means is connected to said first means.

5. The combination as set forth in claim 4 wherein said fourth means also includes a three port circulator, a mixer, a first directional coupler coupling between said source of interrogation signals and one port of said three port circulator, said swith means being coupled to a second port of said three port circulator for permitting bidirectional passage of signals therebetween and said mixer being coupled to the remaining port of said three port circulator to receive reflected signals from said delay line and second means signals thereat.

6. The combination set forth in claim 1 wherein said seventh means is a track and lock circuit for tracking said difference signals from said fourth means, indicative of range X when present, and for producing signals indicative of range X when said fourth means is producing signals indicative of range R.

7. The combination set forth in claim 1 wherein said seventh means is a track and lock circuit for tracking said difference signals from said fourth means, indicative of range R when present, and for producing signals indicative of range R when said fourth means is producing signals indicative of range X.

* * * * *

UNITED STATES PATENT AND TRADEMARK OFFICE
CERTIFICATE OF CORRECTION

PATENT NO. : 4,245,221

DATED : January 13, 1981

INVENTOR(S) : R. W. Kipp and H. C. Johnson

It is certified that error appears in the above-identified patent and that said Letters Patent is hereby corrected as shown below:

Column 1, line 9, "charges" should be --changes--.

Column 3, line 67, "greater" should be --great--.

Column 4, line 37, "is" should be --in--.

Column 6, line 47, "fifthe" should be --fifth--.

Signed and Sealed this

Nineteenth Day of May 1981

[SEAL]

Attest:

RENE D. TEGTMEYER

Attesting Officer     Acting Commissioner of Patents and Trademarks